D. KISHIMA.
COLLAR IRONING MACHINE.
APPLICATION FILED MAR. 17, 1920.
1,395,501.
Patented Nov. 1, 1921.
5 SHEETS—SHEET 1.
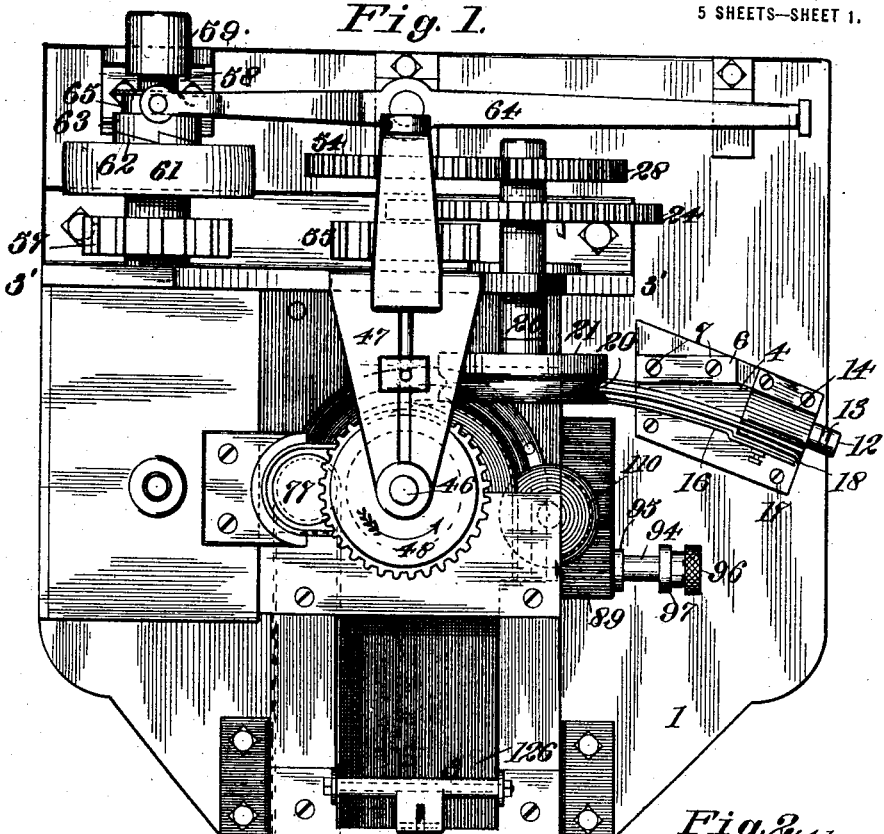
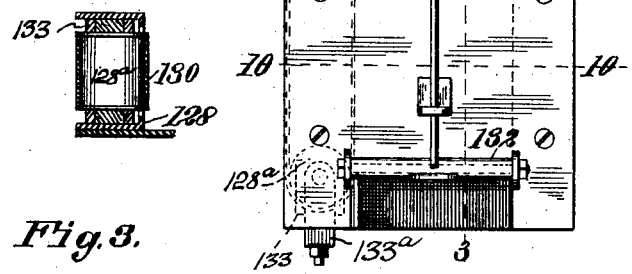
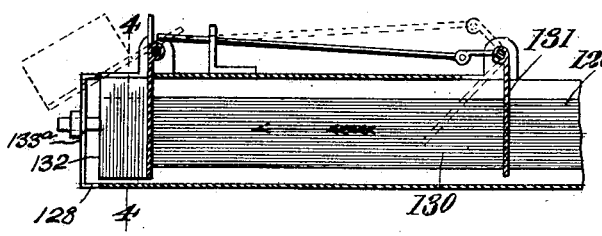
Inventor.
D. Kishima
By Wright & Lewis
Attorneys

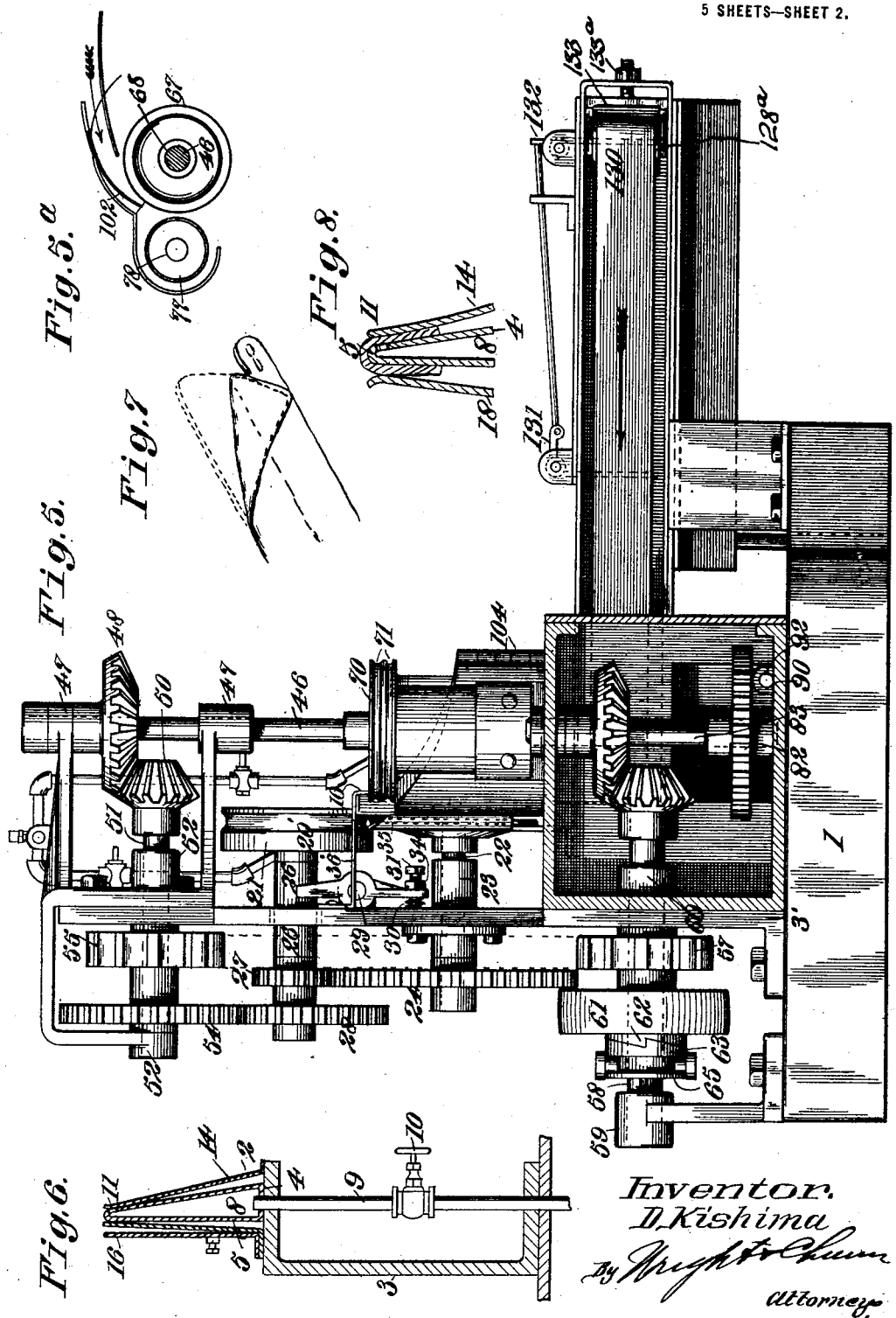

D. KISHIMA.
COLLAR IRONING MACHINE.
APPLICATION FILED MAR. 17, 1920.
1,395,501.
Patented Nov. 1, 1921.
5 SHEETS—SHEET 3.
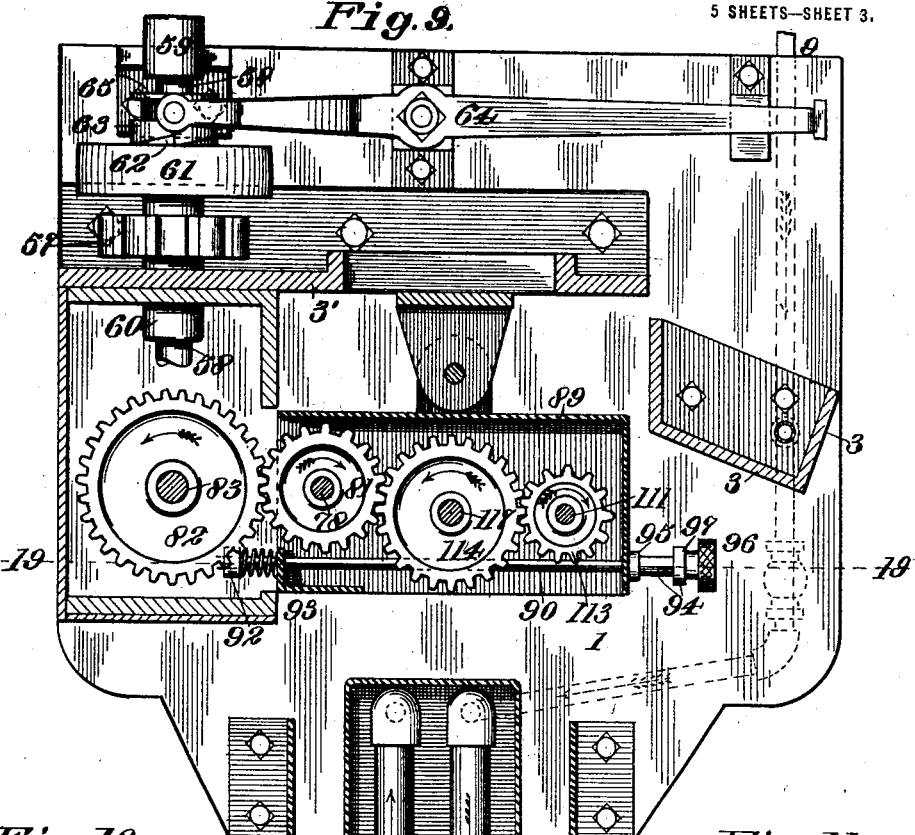
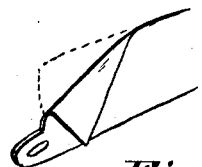
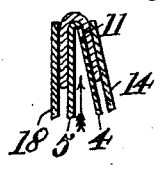
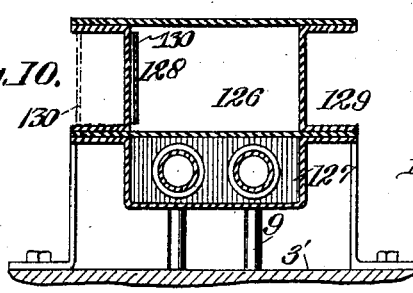
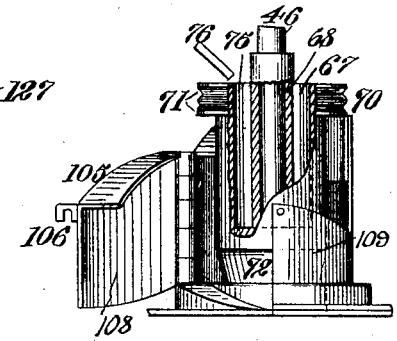
Inventor,
D. Kishima
By Wright & Chun
Attorneys

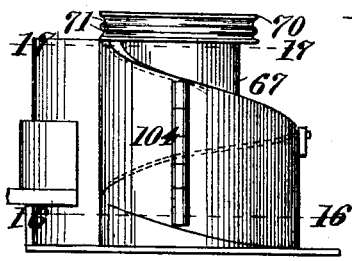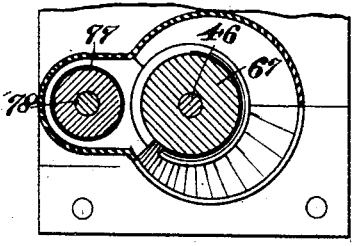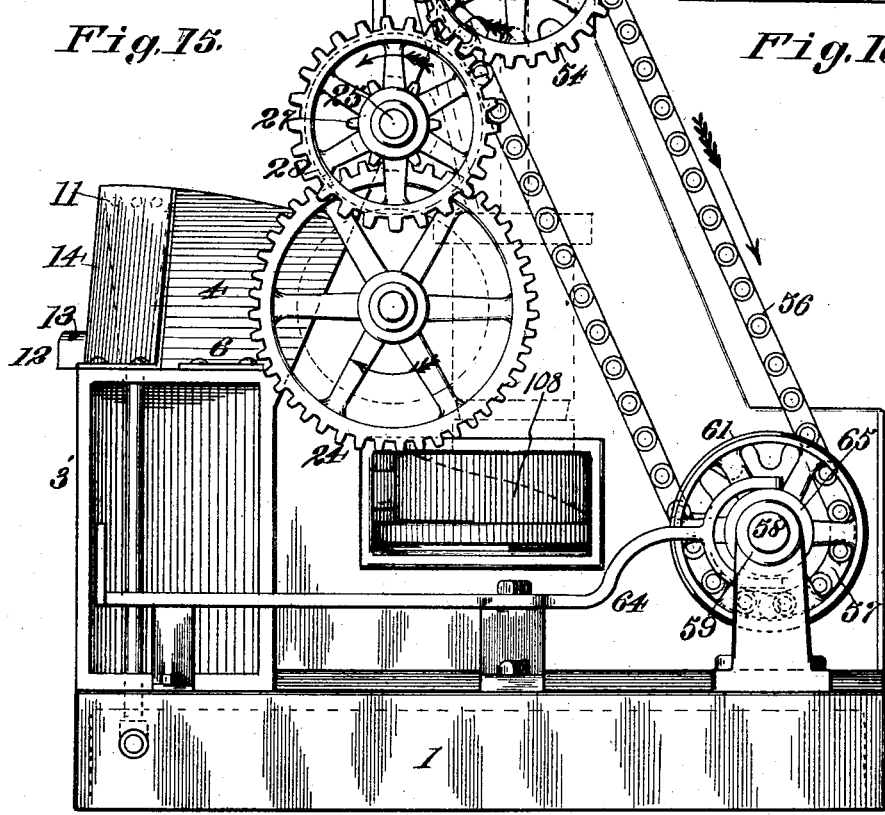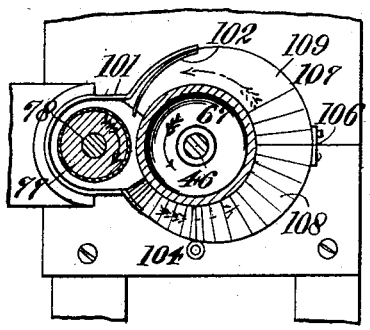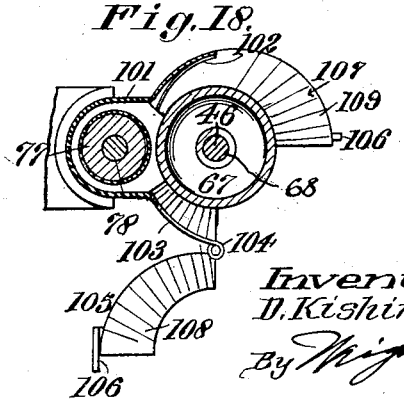

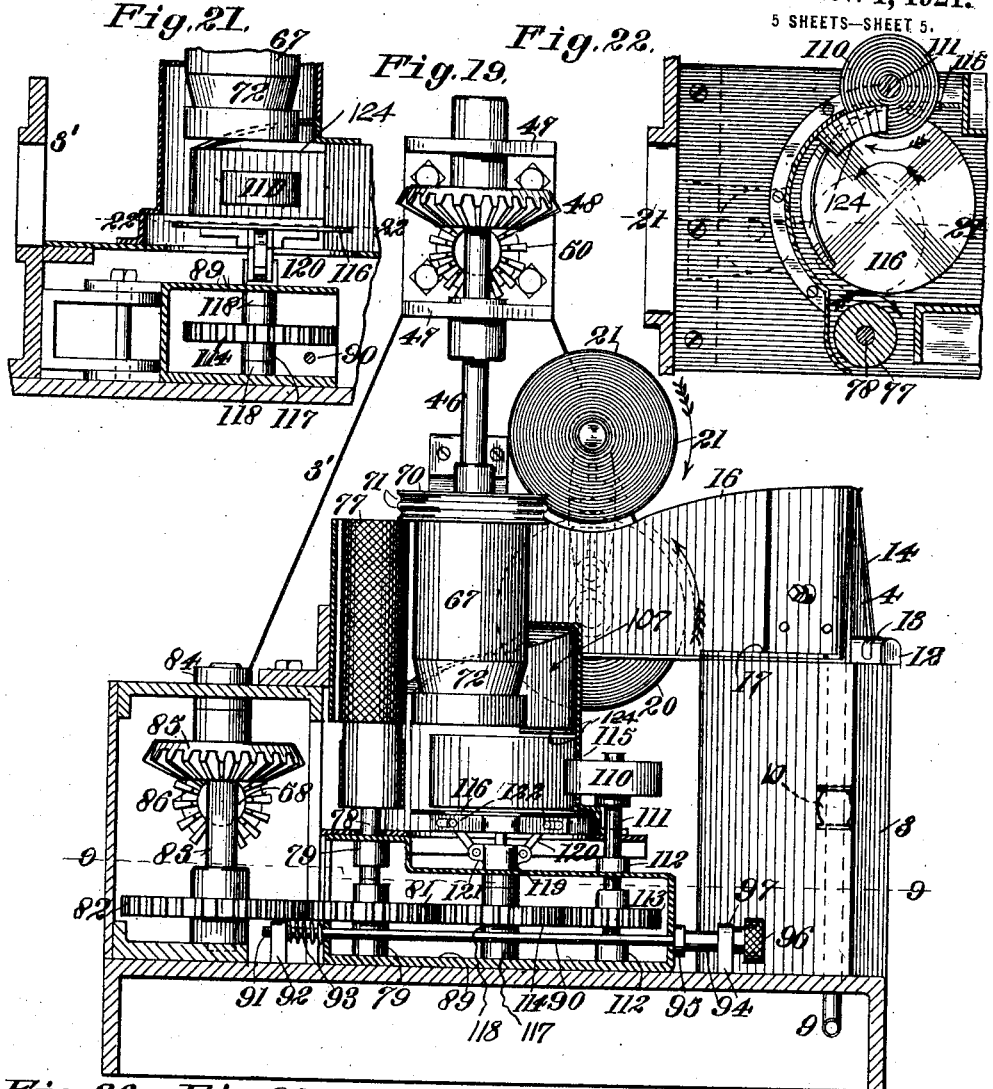
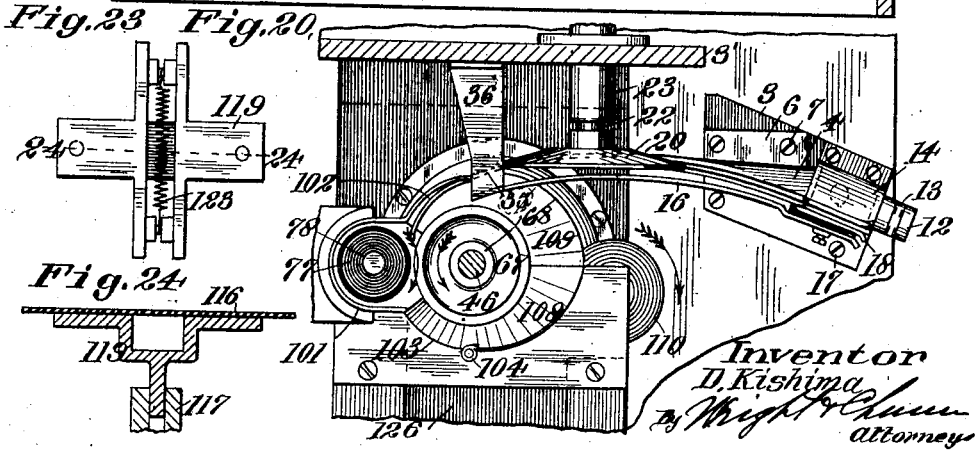

UNITED STATES PATENT OFFICE.

DENJIRO KISHIMA, OF OAKLAND, CALIFORNIA, ASSIGNOR TO HIKOICHIRO KISHIMA, OF OAKLAND, CALIFORNIA.

COLLAR-IRONING MACHINE.

1,395,501.  Specification of Letters Patent.  Patented Nov. 1, 1921.

Application filed March 17, 1920. Serial No. 366,558.

*To all whom it may concern:*

Be it known that I, DENJIRO KISHIMA, a subject of the Emperor of Japan, residing at Oakland, in the county of Alameda and State of California, have invented new and useful Improvements in Collar-Ironing Machines, of which the following is a specification.

This invention relates to improvements in laundrying machines, and more particularly to a machine for ironing, shaping, and delivering collars in such form and so that they may be readily and easily packed in boxes or wrapped in packages.

The apparatus now employed in laundries for shaping and ironing collars and for smoothing the edges thereof usually consists of several independent machines. The primary object of this invention is to provide a machine which will accomplish the work of the several machines such as now used with less labor and in a more reliable, expeditious, and economical manner.

Another object of the invention is to provide a relatively simple, inexpensive, and compact machine of the character described.

The invention possesses other advantages and features, some of which, with the foregoing, will be set forth at length in the following description wherein I shall outline in full that form of the invention which I have selected for illustration in the drawings accompanying and forming a part of the present specification. In said drawings, I have shown one form of the construction of my invention, but it is to be understood that I do not limit myself to such form, since the invention as expressed in the claims may be embodied in a plurality of forms.

Referring to the drawings:

Figure 1 is a top plan view of the machine of my invention.

Fig. 2 is a detail side elevation, partly in section, of means for creasing the collars along the fold lines.

Fig. 3 is a sectional view taken on the line 3—3 of Fig. 1.

Fig. 4 is a sectional view taken on the line 4—4 of Fig. 3.

Fig. 5 is a side elevation of the machine, partly in section, of means for guiding collars into engagement with the ironing member.

Fig. 5ª is a detail plan view partly in section of the means for guiding collars into engagement with the ironing member.

Fig. 6 is a fragmentary vertical sectional view taken through the shaping and guiding means, and part of the frame.

Fig. 7 is a fragmentary perspective view of a turn-down collar.

Fig. 8 is a fragmentary vertical sectional view, showing the collar in place between the guiding and shaping means.

Fig. 9 is a horizontal sectional view taken on the line 9—9 of Fig. 19.

Fig. 10 is a sectional view taken on the line 10—10 of Fig. 1.

Fig. 11 is a detailed side elevation, partly in section, and broken away, of the ironing mechanism, showing one of the collar guides in open position.

Fig. 12 is a fragmentary perspective view of a bat wing collar.

Fig. 13 is a fragmentary detail sectional view showing a bat wing collar inserted in the guiding and shaping means.

Fig. 14 is a rear elevation of the machine.

Fig. 15 is a view of means shown in Fig. 11, taken at right angles to the showing in said figure.

Fig. 16 is a sectional view taken on the line 16—16 of Fig. 15.

Fig. 17 is a sectional view taken on the line 17—17 of Fig. 15.

Fig. 18 is a view similar to Fig. 17 with one of the guide sections open.

Fig. 19 is a sectional view taken on the line 19—19 of Fig. 9.

Fig. 20 is a fragmentary, horizontal sectional view showing in top plan the guiding and ironing mechanism of the invention.

Fig. 21 is a sectional view taken on the line 21—21 of Fig. 22.

Fig. 22 is a sectional view taken on the line 22—22 of Fig. 21.

Fig. 23 is a top plan view of the disk supporting means.

Fig. 24 is a sectional view taken on the line 24—24 of Fig. 23.

Referring to the present embodiment of the invention as illustrated in the drawings, there is provided a suitable base 1 on which is mounted an upright 3, which supports a collar guiding and ironing member 4. This member 4 has a smooth collar-engaging surface 5, on one side thereof, said surface being curved longitudinally so as to conform to the curvature of the collar. The lower edge of this member is provided with a lateral flange 6 whereby the member may be secured by a fastening 7 to the frame. The forward portion of this member is provided with a steam chamber 8 therein, having communication with a suitable source of steam supply through a pipe 9. A valve 10 is mounted in the pipe 9 to provide for control of steam admitted to the chamber. The face of the member 4 opposed to the face 5 is downwardly and outwardly inclined, as at 2, and is adapted to receive the outer fold of a collar, whereas the face 5 is engaged by the inner fold of the collar. A plurality of perforations 11 are formed in the face 2 adjacent to the upper edge of the member 4 and provide for the application of steam to the collar between the folds thereof, so as to soften the collar sufficiently to permit it to be shaped and ironed in the device.

Save for the chamber 8, the member 4 is preferably solid, whereby it will absorb the heat from the steam in the chamber 8 and act as an iron. There may be provided an extension 12 on the front end of the member 4 which has a smooth groove 13 therein adapted to receive the edges of the collar and iron out the rough portions thereof, this member being heated by conduction from the member 4. Mounted on the frame 3 near the forward end of the member 4 is a resilient guide member 14 which engages the member 4 and is spaced from said member 4 slightly at its upper end, whereby the collar fold will engage between the members. It will thus be seen that the collar being operated upon, if of the "turndown" type, will ride over the member 4, the inner flap or fold being placed on the face 5 with the outer fold engaging the face 2 of said member 4. A guide plate 16, which is substantially of the same curvature as the member 4, is mounted, as at 17, upon the frame, so as to be spaced from the member 4 and to assist said member in guiding the collar into the machine. A resilient pressure plate 18 is mounted between the plate 16 and the member 4 so as to engage one fold of a collar inserted between the plates and to press said fold into close engagement with the member 4 during the time that said collar is passing by the point at which the steam is applied to the collar through the perforations 11. The member 4 with the plate 16 guides a collar inserted into the machine so that the inserted end will be engaged and operated upon by mechanism for creasing, ironing, and shaping the collar at the fold line.

The means for creasing and shaping the collar at the fold line comprises a circular disk 20 having a relatively sharp peripheral edge, which works in a circumferential groove 20' in a creasing and pressing wheel 21. The disk 21 is mounted for rotation on a shaft 22, which latter is mounted in a bearing 23 on a frame 3', and upon its outer end has the pinion 24 secured thereto. The wheel 21 is mounted upon a shaft 25 which is supported in an adjustable bearing 26 on a frame 3'. This shaft has a small pinion 27 secured thereto and said pinion meshes with the pinion 24. A larger pinion 28 is fixed to the shaft 25 and is adapted to mesh with the operating mechanism as will later be more fully described. The adjustable bearing 26 is pivotally mounted, as at 29, intermediate of its ends, to the frame 3' and the lower end thereof is forced inwardly by a spring 30. The spring 30 is mounted upon a screw 31 which is fixed to the frame 3 and extends through the lower end of the pivotal mounting of the bearing 26. A nut 34 is adjustably mounted upon the pin and when tightened will produce a closer contact of the wheel 21 with the disk 20. The disk 20 is mounted so that the upper edge thereof is at all times in alinement with the upper edge of the member 4, which latter guides the collar to said disk, whereby the wheel 21 in rotating with the disk will contact with the collar along the top of the fold and immediately on each side thereof, and effect a creasing, ironing action of the collar, the groove 20' in said wheel 21 and disk 20 being shaped so as to produce an even, sharply defined crease.

The plate 16 extends to a point adjacent to the rear edge of the disk 20, so as to guide the collars extending from said disk into engagement with the collar ironing mechanism, which will be later more fully described. Coöperating with the plate 16 is a guide 35 which is longitudinally curved and extends rearwardly of the plate 16 in close relation to said plate. The guide 35 is provided with a connection 36' with the frame 3'. Collars, after passing through the creasing mechanism, that is, the disk 20 and wheel 21, are moved rearwardly by the members 20 ad 21, and between the plates 16 and 35. The rear end of the plate 35 guides the collars in an arc so that they will come into contact with, and be operated upon, by the ironing mechanism to be later described. In order that the collar will be ironed while it is being creased along the fold line, the wheel 21 is preferably formed of heavy metal and is thick, so that it will act as an iron. I also preferably heat this wheel 20 by a flame or flames from a burner pipe 41, which is adapted to direct the flame into a chamber 42 in the rear face of said wheel as said wheel rotates.

The ironing mechanism 40 comprises a vertical shaft 46 journaled in lateral extensions 47 of said frame 3'. The shaft 46 is driven by a bevel gear 48 fixed thereto, which meshes with a bevel pinion 50 fixed to the end of a horizontal shaft 51 which extends through bearings 52 in the frame 3'. The other end of this shaft 51 has fixed thereto a pinion 54 meshing with the pinion 28 on the shaft 25. A sprocket wheel 55 is fixed to the shaft 51 and has a sprocket chain 56 mounted thereon. The chain 56 is rove around a similar sprocket 57 mounted upon a drive shaft 58 which is journaled in bearings 59 and 60. The shaft 58 is driven by a pulley 61 operated from a suitable source of power through a belt, not shown. This pulley is loosely mounted on the shaft 58 and provided on one face with a clutch element 62. A similar clutch element 63 is fixed to the shaft 58 so as to rotate therewith. A pivoted lever 64 engages a grooved wheel 65 on the clutch 63 and moves the clutch 63 into contact with the element 62, whereby the wheel 61 will rotate with the shaft and transmit rotation to the parts of the machine through the chain and sprocket connection. A suitable inclosure, not shown, may be provided for the various gears and pinions, whereby grease from the operating mechanism will not be thrown on to the parts which come into contact with the collars.

Taking up again the description of the ironing mechanism, the main element of this mechanism comprises a preferably cylindrical ironing member 67 which has a hub 68 in the upper end thereof to receive the shaft 46. This member 67 at its upper end is provided with an annular flange 70, having circumferential grooves 71 in which the roughened edges of the collars may be smoothed out by inserting said roughened edges into said grooves during the rotation of the member 67. Near its lower end, the member 67 is reduced and tapered inwardly, as at 72. To heat the ironing member 67, there is provided an annular compartment 75 in said member, which compartment opens at the top of the member and is adapted to receive the lower end of a gas pipe 76, whereby a flame from said lower end will project into the annular chamber. Coöperating with the member 67 is a vertical roller 77, the upper edge of which terminates directly below the flange 71. This roller 77 is mounted upon a shaft 78, journaled in bearings 79 in the frame. This shaft is driven by a gear 81 fixed thereto and which is operatively connected with the drive shaft 58 by a gear 82 which is fixed to a shaft 83 journaled in bearings 84. The shaft 83 carries a bevel pinion 85 which meshes with a bevel pinion 86 fixed to the drive shaft 48.

The bearings 79 for the shaft 78 are formed in the upper and lower sides of a box-like gear casing 89, which latter is slidably mounted upon the base 1. This casing has an adjusting rod 90 extended therethrough, so as to slidably hold the casing upon the base. One end of this rod is screwthreaded, as at 91, and mounted in a screw threaded opening in a lug 92 on the base 1. An expansion spring 93 is mounted upon the rod between one end of the casing 89 and the lug 92. This spring forces the casing with the shaft 78 and roller 77 in a direction which will cause the roller to lie in close proximity to the member 67 and yieldingly maintain said relation. The other end of the rod has a sleeve 94 mounted thereon and said sleeve is provided with a flange 95 on its inner end, which flange engages the adjacent end of the casing 89. The other end of the sleeve is provided with a knurled operating handle 96. A bearing 97 rotatably supports the sleeve and operating handle in a position to be turned. By turning the rod 90, the tension of the spring 93 may be regulated so as to regulate the position of the roller 77 relative to the member 67. The guide plates 16 and 35 direct the collars between the roller 77 and ironing member 67 and said ironing member and collar are rotated so as to cause the collar to be advanced between them and to surround the member 67. These elements 67 and 77 coöperate to shape and press or iron the collars.

A guide member comprises a guard 101, which guard partially surrounds the roller 77, has an angular extension 102 on one side, which acts as a guide for collars passing between the rear ends of the plates 35 and 16 and causes the collars to be directed between the rollers 77 and element 67. On the other side of said guard 101 is provided a guide extension 103 which extends in close relation to the element 67 and concentric therewith for a short distance so as to guide the collars emerging from between the elements 67 and rollers 77 around said element 67. Hingedly connected, as at 104, to the extension 103, is an arcuate guide 105 connected by a latch 106 at its free end with an arcuate guide 107. These guides 105 and 107 practically surround the member 67 in slightly spaced relation to said member and are arranged in spiral form, there being provided a spirally inclined flange 108 on the upper edge of the guide 105 and a similar flange 109 on the guide 107. These flanges are spirally arranged so as to direct the collars downwardly and around the element 67, causing them to completely encircle the element 67 and to be delivered at the lower end of said element, said collar having come into contact at the beginning of the ironing operation, with the upper end of said element. As the collars pass downwardly and around said element 67, the upper edges thereof will engage in the reduced portion 72 and the collars will be prevented from rising upwardly. The reduced portions 72 act as a continuation of the spiral formed by the flanges 108 and 109. The ironing mechanism will thus be inclosed and dust or any matter which would soil the collars cannot gain entrance to the interior of the mechanism owing to the arrangement of the guides.

There is provided means for directing the collars from the lower extremity of the ironing member 67 into delivering apparatus which delivers the collars one at a time in rolled form ready to be nested and packaged in the ordinary manner such as is employed in laundries. A friction roller 110 is mounted upon an upright shaft 111 which is journaled in bearings 112 in the casing 89. The shaft 111 is driven by a gear 113 fixed thereto and which meshes with a gear 114 that is interposed between the gear 113 and the gear 81. The roller 110 projects through an opening 115 formed in the guide 107. As one end of the collar is advanced around by the rotation of the member 67, it is directed downwardly below said element 67 and into contact with the roller 110. This roller, upon engaging said end of the collar, will advance the collar until it is free from engagement with the member 67 and disposed below the member 67. At this time, the collar has been ironed and shaped and is in roller form, the two ends over-lapping one another. As the collar disengages from the roller 67, it engages upon a flat circular disk 116, which disk is yieldingly forced in upright position. The disk 116 is rotatably mounted upon a shaft 117, which latter is journaled in bearings 118. The gear 114 is fixed to the shaft 117 and as it meshes with the gear 81, will be rotated and transmit rotation to the disk through the shaft 117. To provide means for yieldingly holding the collar in upright position, a collar 119 is fixed upon the shaft 117 at its upper end. Links 120 are pivoted, as at 121, to the collar 119 and are slidably pivoted, as at 122, to the under side of the disk 116. A retractile spring 123 is connected at its ends with the links 120 and exerts a tendency through said link to hold the disk 116 in up position. Collars engaging the disk 116 will depress the disk against the action of the spring 123 and be held between said disk and the lower end of the element 67. The guide 107 is provided with a lateral flange 124 disposed below the lower end of the element 67 and which prevents the collars from being pushed upwardly to one side of said element 67, thus insuring that the collars will be delivered from said disk 116 as said disk rotates and by the action of said friction roller 110.

Mounted upon the base 1 and operatively associated with the ironing mechanism is means for delivering the collars one at a time from the machine and for effecting the drying thereof, so that when the collar leaves the machine, it is ready to be packaged in the ordinary manner. This means includes a delivery chamber 126 through which collars which are delivered and are heated by a heating chamber 127 extending along the bottom of the delivery chamber. The delivery chamber is defined on its sides by frames 128 and 129. Upon the frame 128 and lower end of the roller 77 is mounted an endless belt 130. This frame 128 is spaced from the frame 129 a distance which will permit the collars to be engaged between them and be carried forwardly through the passage 126. The frame 28 carries an adjustable roller 128$^a$ upon which the belt is mounted, the belt being driven by the roller 77. A one-way intake valve 131 is hinged to the top wall 132 of said chamber 126, and when engaged by a collar being carried along by the belt 130, will open and permit the collar to enter the chamber, said valve closing by gravitation as soon as the collar is passed into the chamber. An outwardly opening valve 132 is disposed at the end of the chamber 126 and is pushed open by collars advancing through said chamber. By having this chamber 126 valved, heat provided from the heating chamber is retained therein and collars which enter the chamber and are damp after having been moistened and ironed, will be quickly dried prior to delivery thereof from the machine. As a means for adjusting the roller 128$^a$ so as to regulate the tension of the belt there is provided an adjustable holder or bearing 133 for said roller. This bearing 133 is slidable on the frame 128 and is adjusted by suitable adjusting means 133$^a$, as shown in Fig. 5.

The operation of the machine is as follows:

The collars, after having been washed and starched, in their dry stiff condition are fed into the machine, one at a time, by an operator who places one fold of the collar, preferably the inner fold, into the machine between the forward ends of the member 4 and plate 18, shoving the collar along with the outer fold bent over upon the outside of the member 4 between the members 4 and 14, as shown in Fig. 8, until the inserted end of the collar is engaged by the disk 20 and roller 21. In inserting the collar it will be moistened by steam issuing from the perforations 11. Next, the collar engages between the roller 21 and disk 20, and is advanced by friction through contact with these elements, in folded-over position and between the plates 16 and 35, which plates converge toward their rear edges so that the flaps of the collar will be pressed together. Before the collar has passed from between the members 20 and 21, the advanced end thereof will have been guided into contact with the ironing element 67, and as this member is rotated in a counter clock-wise direction (Fig. 1), the collar will be carried by said element, and pressed between said element and the sides of the guides 105, 106. As said collar is moist, upon coming into contact with the heated ironing element 67, they will be shaped in circular form and advanced from the upper end of said element to the lower end thereof, at which point they are discharged onto the disk 116. As the collars are advanced on to the disk 116, said disk will be depressed by the collars so that the collars will be clamped or held between the lower end of the element 67 and flange 124, and disk 116, during the rotation of said disk 116. This action will cause the collars, which, owing to the fact that they have been spirally advanced around the element 67 and have a tendency to retain a twisted form, to remain in a position sufficiently long to overcome this tendency and cause the collar to assume a rolled form with the ends lying in overlapping relation. The friction roller 110 turns the collar and moves it into engagement with the belt 130 and the lower end of the roller 77 and this effects an advancement of the collar from the disk 116 into the chamber 126. This belt in rotating causes the collar to pass through the chamber 126 and to be dried while passing through said chamber.

"Bat wing" collars, such as shown in Fig. 12 of the drawings, are not run entirely through the machine. In ironing and shaping these collars, the ends are alternately placed between the members 14 and 4, and bent over into the form shown in Fig. 12. To shape the collars after the ends have been bent into the "bat wing" form, and said wings have been moistened by steam issuing through the perforations 11, the hinged side 105 of the casing for the members 67 is opened so as to permit the collar to be inserted between the members 67 and the stationary part of the casing. This will cause the collar to be carried around by the rotation of the member 67 and to be shaped as it is rotated. After rotating around with the member 67, once, the collar passes out through the open side of the casing and an operator, upon receiving the collar, deposits it into the space between the disk 116 and the valve 131. This space is left open so that the "bat wing" collars may be placed in the position to be carried through the drying compartment by the belt 130, during the operation of ironing and shaping turn-down collars. In this connection, it will be noted that collars push one another through the drying compartment and discharge therefrom one at a time by pressing outwardly upon and opening the valve 132.

I claim:

1. In a machine of the character described, a frame, means for creasing a collar along the fold line thereof, means through which the collar is advanced and moistened prior to its engagement with the creasing means, means for shaping the collar mounted in the frame, and on to which collars are advanced from said creasing means, a chamber through which collars after having been operated upon by said shaping means are moved, and means for heating said chamber.

2. In a machine of the character described, a frame, a collar ironing member rotatably mounted on said frame, means for guiding the collars into engagement with said member, and means for directing said collars spirally and downwardly around and toward the lower end of said member, a revolving member on to which collars are discharged from said member, and means for moving collars off of said revolving member.

3. In a machine of the character described, a frame, a collar ironing member rotatably mounted on said frame, means for guiding the collars into engagement with said member, and means for directing said collars spirally and downwardly around and toward the lower end of said member, a revolving member on to which collars are discharged from said member, means for moving collars off of said revolving member, and a drying compartment, into which collars are moved by said last-named means.

4. In a machine of the character described, a frame, opposed guide and shaping members between which the folds of the turn-down collar are inserted and advanced, opposed creasing rollers engaging opposite sides of the collar at the fold line thereof, means for rotating said rollers so as to advance a collar engaged thereby, a rotatable cylindrical ironing member on said frame, means for rotating said member, means for guiding collars from said rollers into engagement with said ironing member, spiral guide flanges for conducting the collars downwardly and around said member, when said member is rotated, a discharge outlet for said collars, a drying compartment and means for moving collars after disengaging from said ironing member through said drying compartment.

DENJIRO KISHIMA.